United States Patent
Li

(10) Patent No.: US 12,143,535 B2
(45) Date of Patent: *Nov. 12, 2024

(54) USER INTERACTION ENHANCEMENT FOR CONTACT CENTER

(71) Applicant: Zoom Video Communications, Inc., San Jose, CA (US)

(72) Inventor: Xu Hua Li, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,179

(22) Filed: Aug. 11, 2023

(65) Prior Publication Data

US 2023/0388421 A1 Nov. 30, 2023

Related U.S. Application Data

(63) Continuation of application No. 17/390,771, filed on Jul. 30, 2021, now Pat. No. 11,765,272.

(51) Int. Cl.
| | |
|---|---|
| *H04M 3/523* | (2006.01) |
| *G06N 20/00* | (2019.01) |
| *G10L 15/26* | (2006.01) |
| *H04M 3/51* | (2006.01) |

(52) U.S. Cl.
CPC ......... *H04M 3/5232* (2013.01); *G06N 20/00* (2019.01); *G10L 15/26* (2013.01); *H04M 3/5175* (2013.01); *H04M 2203/551* (2013.01)

(58) Field of Classification Search
CPC ............ H04M 3/5232; H04M 3/5175; H04M 2203/551; G06N 20/00
USPC ....... 379/266.01, 266.1, 266.08, 265.09, 242
See application file for complete search history.

(56) References Cited

U.S. PATENT DOCUMENTS

| | | | |
|---|---|---|---|
| 2005/0286705 A1* | 12/2005 | Contolini | H04M 3/5232 |
| | | | 379/88.02 |
| 2007/0198284 A1 | 8/2007 | Korenblit et al. | |
| 2017/0316438 A1 | 11/2017 | Konig et al. | |
| 2020/0273052 A1 | 8/2020 | Ganti et al. | |

(Continued)

FOREIGN PATENT DOCUMENTS

WO 2021108454 A2 6/2021

OTHER PUBLICATIONS

RingCentral, What is a Contact Center as a Service (CCaaS), https://www.ringcentral.com/ccaas.html, Jul. 25, 2021, 9 pages.

(Continued)

*Primary Examiner* — Thjuan K Addy
(74) *Attorney, Agent, or Firm* — Young Basile Hanlon & MacFarlane, P.C.

(57) ABSTRACT

A contact center system correlates one or more past user interactions to a current user interaction with the contact center system. The current user interaction may in some cases use a different communication modality (e.g., chat, voice, video, SMS, email, or social) than a past user interaction. The contact center system may automatically alert a supervisor agent when the system detects that a certain user warrants more attention. Real-time assistance may be provided to an agent of the contact center system based on aggregated data from a user's history of user interactions across modalities.

20 Claims, 8 Drawing Sheets

(56) References Cited

U.S. PATENT DOCUMENTS

2021/0158235 A1 5/2021 Sivasubramanian et al.
2021/0158813 A1 5/2021 Sivasubramanian et al.

OTHER PUBLICATIONS

Nice, Call Center Software—Cloud Contact Center Solutions, The contact center software that makes every customer experience extraordinary, Jul. 25, 2021, 8 pages.
A Guide to Call Center Sentiment Analysis, Calabrio, Customer Interaction Analytics, https://www.calabrio.com/wfo/customer-interaction-analytics/call-center-sentiment-analysis/, Jul. 25, 2021, 10 pages.
BlueGranite, Call Center Sentiment Analysis: Client Relationships Redefined, https://www.bluegranite.com/solution-briefs/call-center-sentiment-analysis-client-relationships-redefined, Jul. 25, 2021, 6 pages.
Sentiment Analysis: Key To Empathetic Customer Service, Ameyo, https://www.ameyo.com/blog/sentiment-analysis-key-to-empathetic-customer-service, Jul. 25, 2021, 2 pages.
International Search Report and Written Opinion mailed on Nov. 4, 2022 in corresponding PCT Application No. PCT/US2022/038526.

\* cited by examiner

USER INTERACTION ENHANCEMENT FOR CONTACT CENTER

CROSS-REFERENCE TO RELATED APPLICATION(S)

This application is a continuation of U.S. patent application Ser. No. 17/390,771, filed Jul. 30, 2021, the entire disclosure of which is hereby incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for data aggregation for user interaction enhancement.

One aspect of this disclosure is a method comprising correlating a past user interaction with a contact center system to a current user interaction with the contact center system; aggregating data of the past user interaction with data of the current user interaction to obtain aggregated interaction data; generating a message based on the aggregated interaction data; and presenting the message in a user interface.

One aspect of this disclosure is a system comprising a processor, and a memory, wherein the memory stores instructions executable by the processor to correlate a past user interaction with a contact center system to a current user interaction with the contact center system; aggregate data of the past user interaction with data of the current user interaction to obtain aggregated interaction data; and generate a message based on the aggregated interaction data.

One aspect of this disclosure is a non-transitory computer-readable storage medium, comprising executable instructions that, when executed by a processor, facilitate performance of operations, comprising correlating a past user interaction with a contact center system to a current user interaction with the contact center system; aggregating a first duration of the past user interaction with a second duration of the current user interaction to obtain aggregated duration; generating a message based on the aggregated duration; and presenting the message in a user interface.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
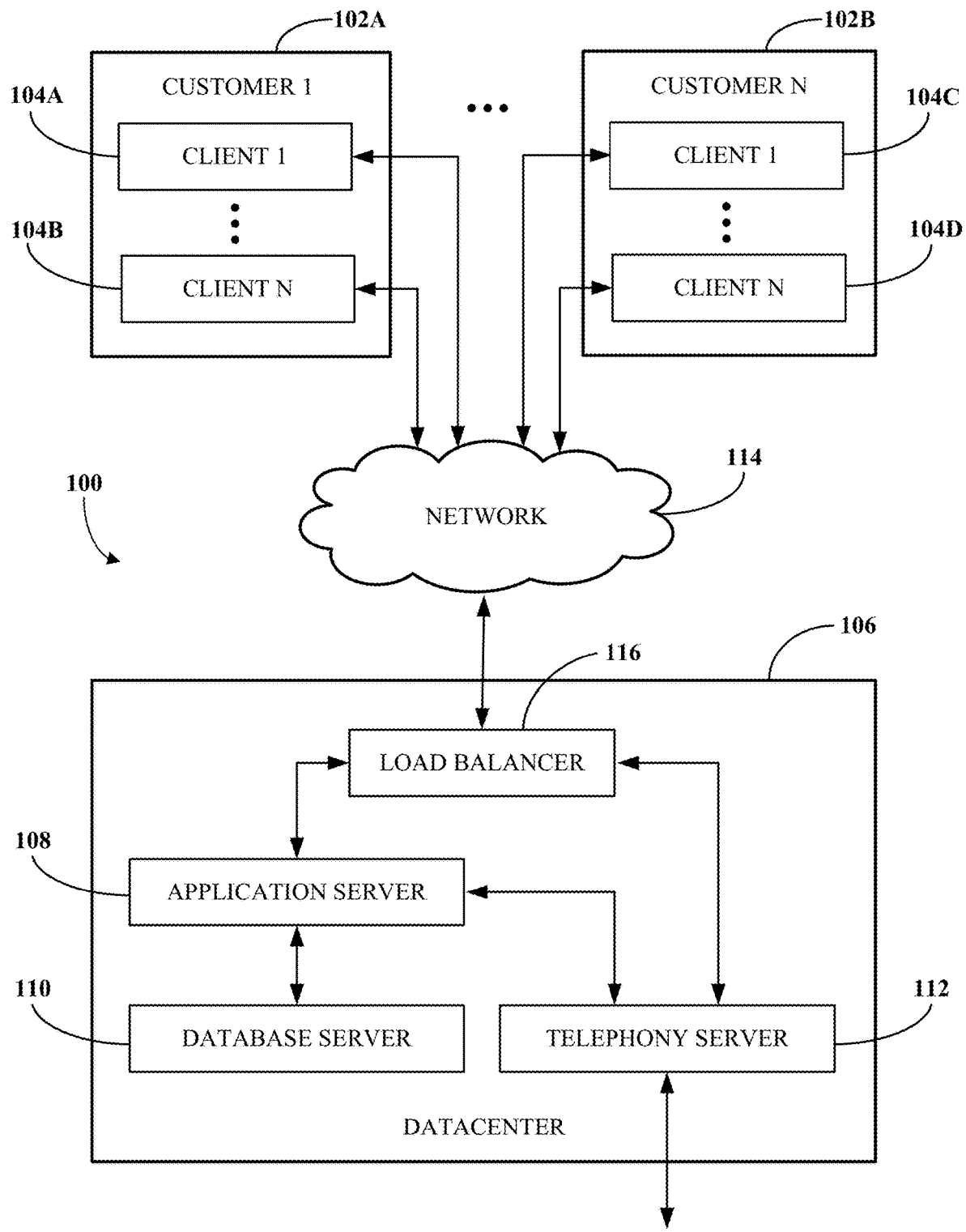
FIG. 1 is a block diagram of an example of an electronic computing and communications system.

Contact centers, which are user interaction centers that provide services addressing one or more communication modalities, may be a vital unit of an organization as they influence the overall perception of how responsible an organization is. In the era of call centers, users just used communicated with a call center over the telephony modality only. More recently, omnichannel users are reaching out to brands through communication modalities of their choice and convenience. For example, they can use live chat, email, tweet, text, video, voice and utilize technology in myriad ways. At the same time, users also expect convenient, relevant, and responsive engagement across every interaction, whether it is in-person or online. This changing and varied technological landscape makes it challenging for supervisors and other agents who handle contact center inquiries from a user to understand the whole picture of that user's journey through multiple user interactions with the contact center. Information regarding that user's journey (i.e., history of user interactions) may help new agents understand past interactions with the user by other agents, which may have been conducted using different communication modalities.

A second related problem is optimization of a contact center over time to conditions experienced in the field. Contact centers today lack a good way to show what the aggregated historical data of the user journeys look like. This information could help determine how to improve the operation of a contact center system over time. In some implementations, system resources could be allocated to process user interaction queues with longer wait times or menu options in a user interaction could be reordered to improve user interaction flow. There is a need for insights into the user journey and recommendations for how to improve a user interaction handling process.

Implementations of this disclosure address problems such as these by tracking user interaction across service touch-points, regardless which communication modalities a user chooses to reach out through. Some implementations may provide real-time data that can be analyzed to facilitate personalized user interactions. Agents, including supervisors, in a contact center can better understand a user's needs and deliver better service.

In one example scenario, a user reaches out to a support number of a contact center multiple times (e.g., by going through an interactive voice response (IVR) menu system and voice queues). The contact center system may track these activities, including responses to the IVR menus from the user device, and present information about them to agents of the contact center system. An agent (e.g., a supervisor) may be notified about the user's prior user interactions and receive advice regarding how to deal with an impatient customer.

In another example scenario, a user selects different communication modalities during their user interaction the real-time analytics may give an agent (e.g., a supervisor) at different touchpoints visibility of the user's entire user interaction history. Where a user has already provided information about the reason of calling and/or their personal information, an agent (e.g., a supervisor) may have the information at that moment, dispensing with the need to ask again.

A benefit of knowing relevant information about this user's journey will avoid the need of a user answering the same questions over and over. Thus, an agent (e.g., a supervisor) may be enabled to serve the user more efficiently.

The historical user journey insight system may store each user's end-to-end user interaction journey into the system. Aggregated user interaction data across users may provide an overview of a general pattern of users reaching out to an organization (e.g., what percentage through which modality, how often service touchpoints go through, and how many additional modalities are used by customers to communicate with the contact center). Based on trend and usage information a historical user journey insight system may also provide recommendations on how to improve the processes of a contact center.

In an example scenario, a contact center system detects many users cannot get service in a billing queue. The contact center system may provide suggestions to adjust the IVR menu or allocate additional resources to the billing queue in response to this aggregated data. In some implementations, historical data of user interactions aggregated across users may be leveraged to extract key words and phrases and train an agent of the contact center.

As used herein, an "agent" of a contact center system is a person that uses a device configured to enable the agent to handle an aspect of a user interaction.

As used herein, a "supervisor" of a contact center system is a type of agent that uses a device configured to enable the supervisor to monitor and/or intervene in a user interaction being handled by another agent with their own agent device.

Although the implementations of this disclosure are described with respect to contact center systems, the implementations of this disclosure may in some cases be used with respect to other types of customer interaction systems which handle user inquiries across multiple modalities.

To describe some implementations in greater detail, reference is first made to examples of hardware and software structures used to implement data aggregation for user interaction enhancement. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
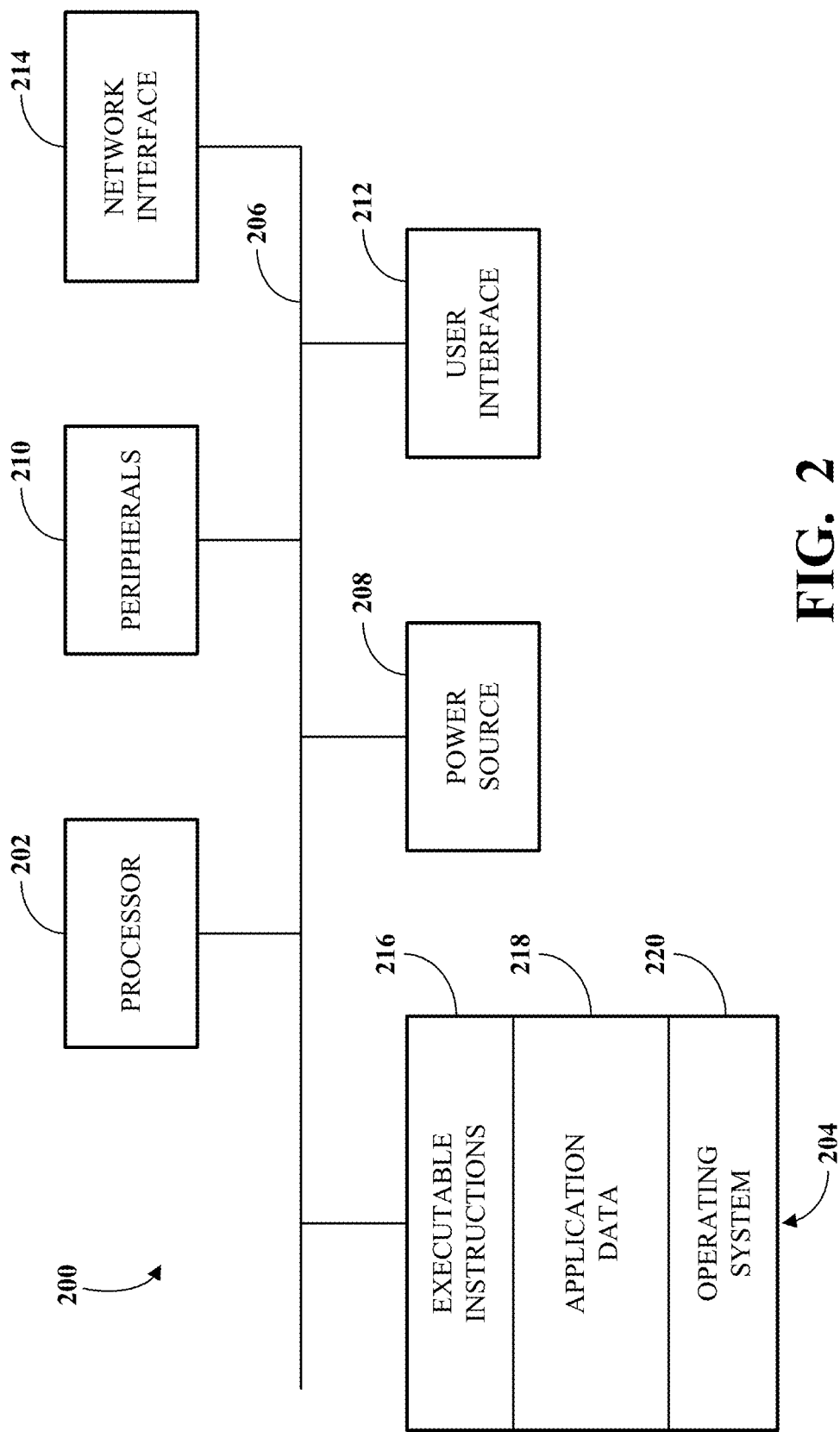
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
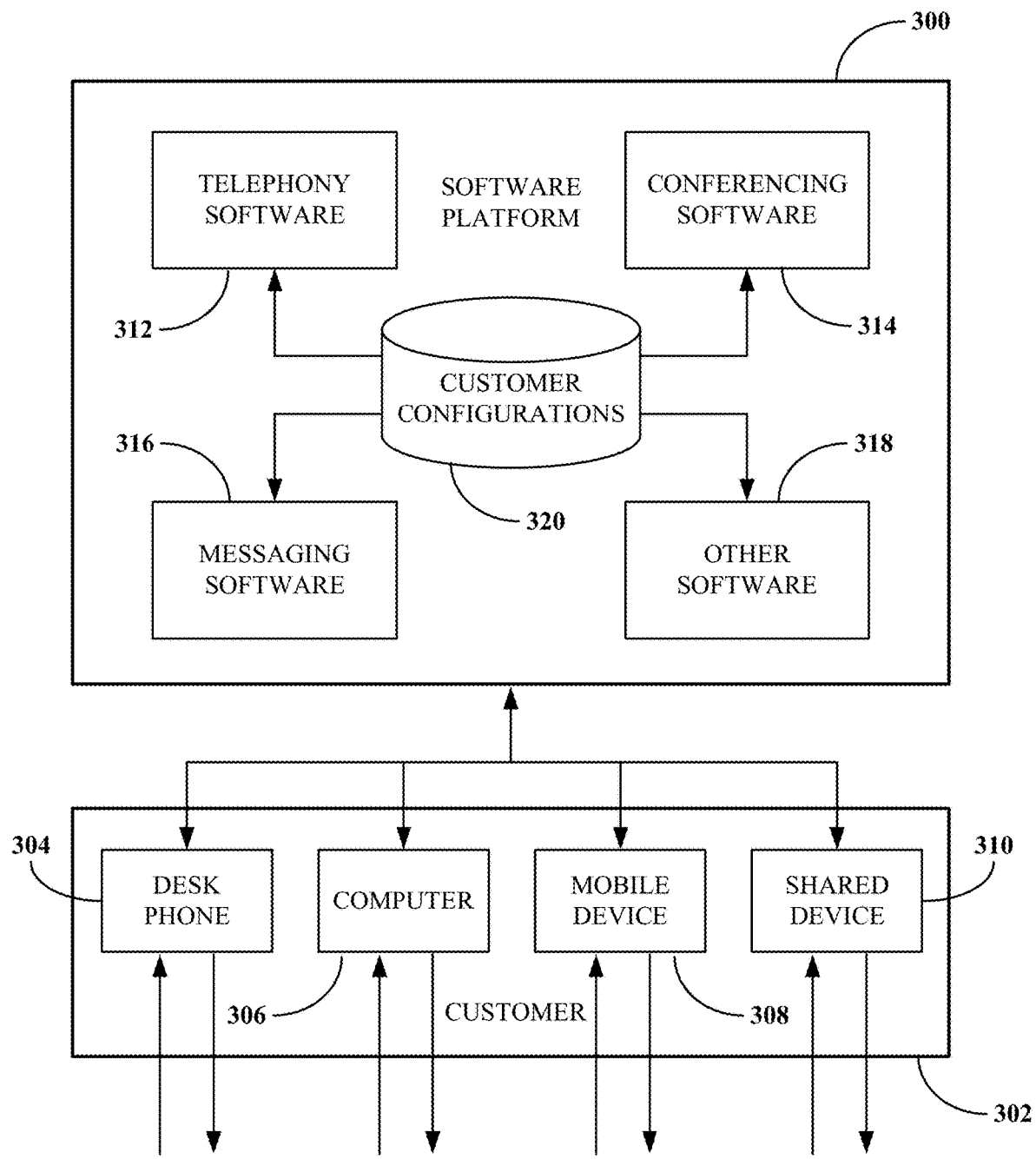
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software that correlates user interactions for a user and aggregates data regarding past user interactions of a user with a current user interaction of the user to provide insights to agents of contact center so as to enhance the current user interaction. The other software 318 can also or instead include software that aggregates data of past user interactions across users to enable reconfiguration of a contact center system.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
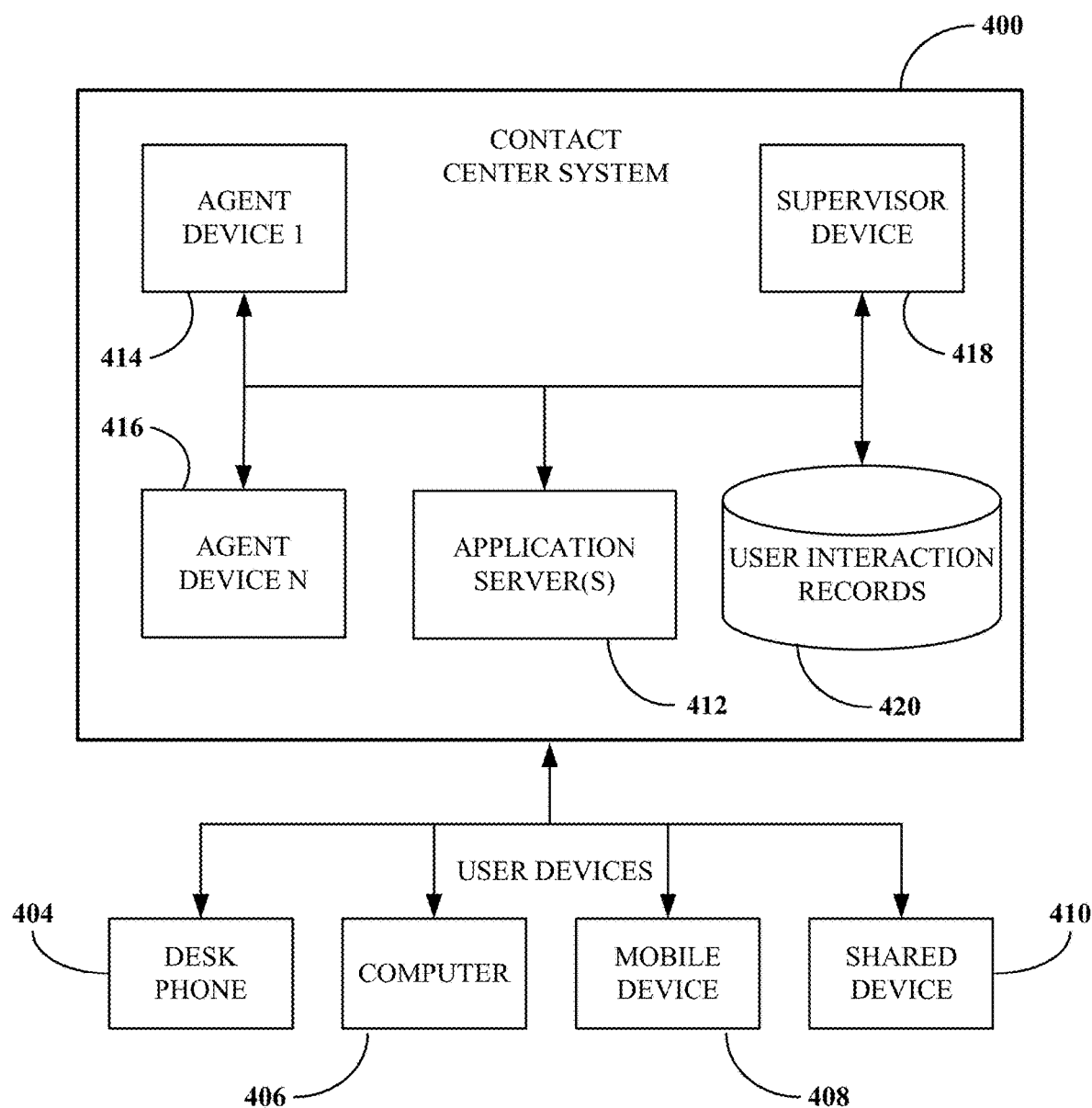
FIG. 4 is a block diagram of an example of a contact center system configured to conduct user interactions.

FIG. 4 is a block diagram of an example of a contact center system 400 configured to conduct user interactions. The contact center system 400 communicates (e.g., via one or more communications networks) with user devices including a desk phone 404, a computer 406, a mobile device 408, and a shared device 410, which may, for example, be the clients 304 through 310 shown in FIG. 3. The contact center system 400 may enable users to interact with the contact center system 400 using a variety of communication modalities, for example, voice, video, short message service (SMS) text, chat, social media, and email. The contact center system 400 includes one or more application servers 412 (e.g., the application server 108 shown in FIG. 1) configured to manage user interactions with the contact center system 400. In some implementations, the application servers 412 are configured automatically conduct user interactions. For example, the application servers 412 may be configured to use IVR software to conduct a user interaction in a voice modality (e.g., for a user of the desk telephone 404). In another example, such as in addition to or instead of the preceding example, the application servers 412 may be configured to use chat bot software to conduct a user interaction in a chat modality (e.g., for a user of the desk telephone 404). The application servers 412 may be configured to route some user interactions to an agent device, such as the agent device 414, the agent device 416, or the supervisor device 418, for handling by a human agent. Note: although two agent devices (414 and 416) and one supervisor device (418) are explicitly shown, a contact center system could be provisioned to include practically any number of these devices.

The contact center system 400 includes a data store 420 (e.g., implemented by a database server, such as the database server 110 shown in FIG. 1) configured to store data for user interactions. The data store 420 may store data for past user interactions, which are user interactions that have ended as of a given time. In some implementations, the data store 420 may also store data for current user interactions, which are user interactions that are ongoing as of a given time. For example, the data of a past user interaction may include a duration of the past user interaction. For example, such as in addition to or instead of the preceding example, the data of a current user interaction may include a duration of the current user interaction. For example, such as in addition to or instead of the preceding example, the data of a past user interaction may include a sentiment score determined based on a transcript of the past user interaction using a machine learning model. For example, such as in addition to or instead of the preceding example, the data of a current user interaction may include a sentiment score determined based on a transcript of the current user interaction using a machine learning model. The applications servers 412 may be configured to access and update the data for user interactions stored in the data store 420. In some implementations, the data of a user interaction includes identifying data (e.g., a telephone number, an email address, or an IP address) associated with the user interaction, which may be used (e.g., by the application servers 412) to correlate multiple user interactions with a same user.

The application servers 412 may be configured to correlate one or more past user interactions with the contact center system 400 to a current user interaction with the contact center system 400. For example, the past user interaction and the current user interaction may use different modalities for communication (e.g., voice, video, or chat). In an example, the past user interaction may be a chat session, and the current user interaction may be a phone call. The application servers 412 may be configured to aggregate data of the past user interaction with data of the current user interaction to obtain aggregated interaction data. For example, aggregating the data of the past user interaction with the data of the current user interaction may include determining an aggregated duration based on a duration of the past user interaction and a duration of the current user interaction (e.g., as a weighted sum). For example, aggregating the data of the past user interaction with the data of the current user interaction may include determining an aggregated sentiment score based on a sentiment score of the past user interaction and a sentiment score of the current user interaction. The application servers 412 may be configured to prioritize, based on the aggregated interaction data, the current user interaction in one or more queues of user interactions in the contact center system 400 (e.g., a queue for waiting for an agent of the contact center system 400. The application servers 412 may be configured to generate a message based on the aggregated interaction data. For example, the message may include prompts for assisting an agent of the contact center system 400 to complete the current user interaction. In some implementations, the application servers 412 may be configured to automatically trigger an alert message for a second agent (e.g., a supervisor using the supervisor device 418) of the contact center system 400. For example, the application servers 412 may be configured to implement the technique 500 of FIG. 5 and/or the technique 600 of FIG. 6.

Figure 5:
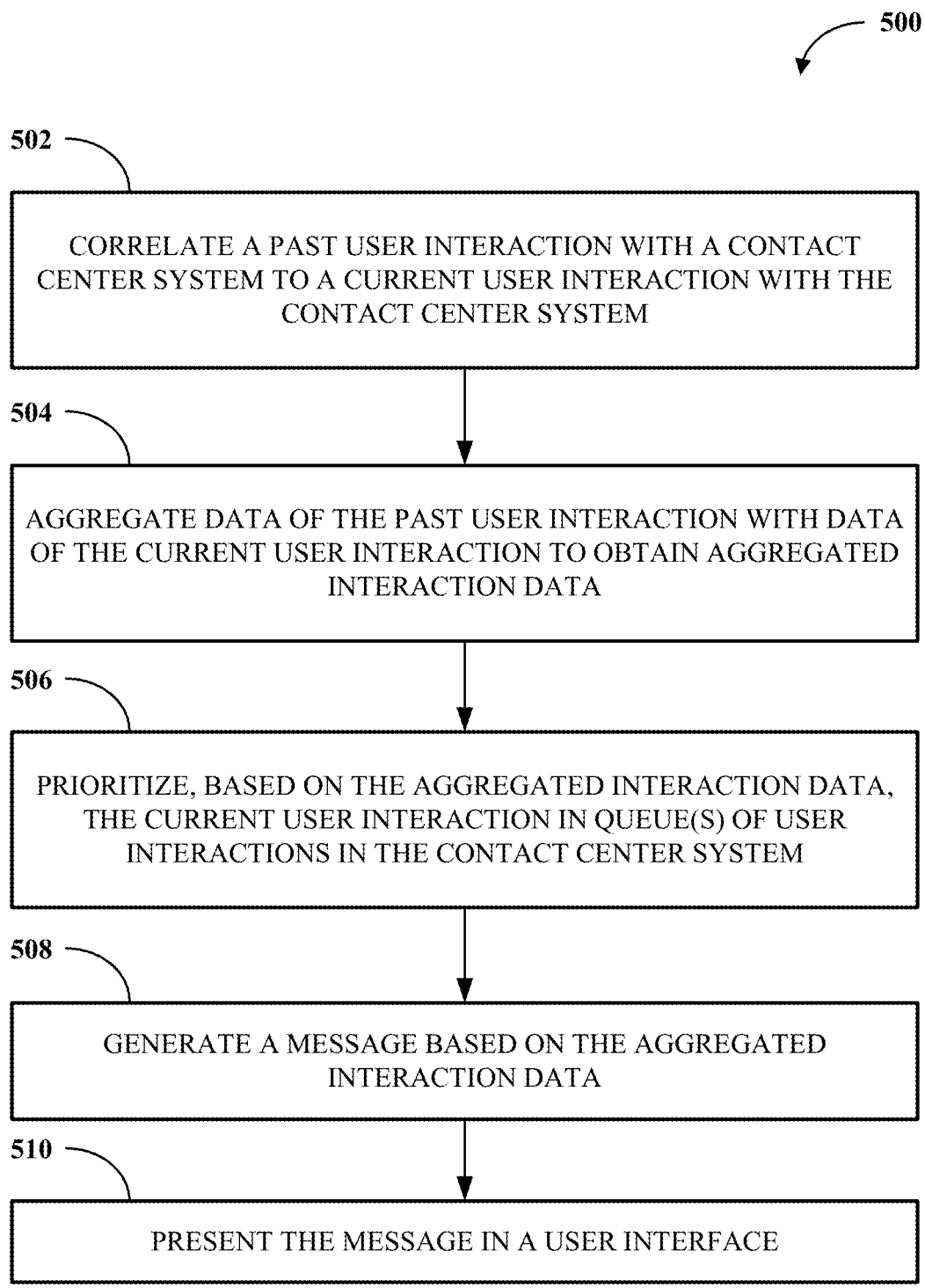
FIG. 5 is a flowchart of an example of a technique for data aggregation for user interaction enhancement.

To further describe some implementations in greater detail, reference is next made to examples of techniques which may be performed using data aggregation for user interaction enhancement. FIG. 5 is a flowchart of an example of a technique 500 for data aggregation for user interaction enhancement. The technique 500 can be executed using computing devices, such as the systems, hardware, and software described with respect to FIGS. 1-4. The technique 500 can be performed, for example, by executing a machine-readable program or other computer-executable instructions, such as routines, instructions, programs, or other code. The steps, or operations, of the technique 500 or another technique, method, process, or algorithm described in connection with the implementations disclosed herein can be implemented directly in hardware, firmware, software executed by hardware, circuitry, or a combination thereof.

For simplicity of explanation, the technique 500 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 502, the technique 500 includes correlating a past user interaction with a contact center system (e.g., the contact center system 400) to a current user interaction with the contact center system. In some implementations, the past user interaction may be correlated to the current user interaction by comparing identifying data of the two user interactions. For example, a match between phone numbers of two user interactions may be detected to correlate the two user interactions. For example, such as in addition to or instead of the preceding example, a match between email addresses of two user interactions may be detected to correlate the two user interactions. For example, such as in addition to or instead of the preceding example, a match between IP addresses of two user interactions may be detected to correlate the two user interactions. In some implementations, the past user interaction and the current user interaction use different modalities for communication (e.g., voice, video, SMS text, chat, social media, or email). For example, the past user interaction is a chat session, and the current user interaction is a phone call. In some implementations, identifying data (e.g., phone number, email address, IP address, or name) may be requested from a user during a user interaction to facilitate correlation of user interactions that use different communication modalities. In some implementations, other techniques may be used to correlate two user interactions, such as voice recognition or facial recognition.

At 504, the technique 500 includes aggregating data of the past user interaction with data of the current user interaction to obtain aggregated interaction data. Data of user interactions may include data indicative of a user satisfaction or frustration. For example, text transcript from a user interaction may be analyzed (e.g., using a machine learning system that has been trained to predict a satisfaction level based on text) to determine an estimate of a satisfaction level of a user during the user interaction. For example, such as in addition to or instead of the preceding example, speech signal from a user interaction, which may convey tone of speech, may be analyzed to determine an estimate of a satisfaction level of a user during the user interaction. For example, such as in addition to or instead of the preceding example, video signal from a user interaction, which may facial expressions, may be analyzed to determine an estimate of a satisfaction level of a user during the user interaction. An estimate of user satisfaction and/or the data on which such an estimate is based may be included in the data of a user interaction. The duration of a user interaction may also provide significant information about a user's level of satisfaction. In some implementations, the data of the past user interaction includes a first duration of the past user interaction, the data of the current user interaction includes a second duration of the current user interaction, and aggregating the data of the past user interaction with the data of the current user interaction includes determining an aggregated duration based on the first duration and the second duration. For example, the aggregated duration may be determined as a sum (e.g., a weighted sum) of the second duration and one or more durations of past user interactions that have been correlated to the current user interaction, including the first duration. A duration may be weighted more heavily if it is more recent. In some implementations, the data of the past user interaction includes a first sentiment score determined based on a transcript of the past user interaction using a machine learning model, the data of the current user interaction includes a second sentiment score determined based on a transcript of the current user interaction using a machine learning model, and aggregating the data of the past user interaction with the data of the current user interaction comprises determining an aggregated sentiment score based on the first sentiment score and the second sentiment score. For example, the aggregated sentiment score may be determined as a sum (e.g., a weighted sum) of the second sentiment score and one or more sentiment scores of past user interactions that have been correlated to the current user interaction, including the first sentiment score. In some implementations, a duration may be weighted more heavily if it is more recent.

At 506, the technique 500 includes prioritizing, based on the aggregated interaction data, the current user interaction in one or more queues (e.g., queues to wait for a human agent) of user interactions in the contact center system. In some implementations, a priority score for the current user interaction may be determined based on the aggregated interaction data. The priority scores for multiple current user interactions in a queue may be used to sort those current user interactions will be popped from the queue next when a resource become available. For example, a priority score for the current user interaction may be determined based on an aggregated duration and/or an aggregated sentiment score for correlated user interactions of the user (e.g., proportional to an aggregated duration, proportional to an aggregated sentiment score, or as linear combination of an aggregated duration and an aggregated sentiment score).

At 508, the technique 500 includes generating a message based on the aggregated interaction data. The message may provide information about the user's history of correlated user interactions and/or hints about how best deal with the user. In some cases, the message may include prompts for assisting an agent of the contact center system to complete the current user interaction. For example, the message may include a real-time assist card with tactics to deal with an unhappy user.

At 510, the technique 500 includes presenting the message in a user interface (e.g., a webpage). In some implementations, the message may be presented by transmitting the message as part of a graphical user interface using a network interface (e.g., the network interface 214). The message may be transmitted to a device (e.g., the agent device 414 or the supervisor device 418) that can be used by an agent of the contact center system to view the message. In some implementations, the message may be presented by displaying the message on a local peripheral (e.g., a monitor, a touchscreen, or other display device).

Figure 6:
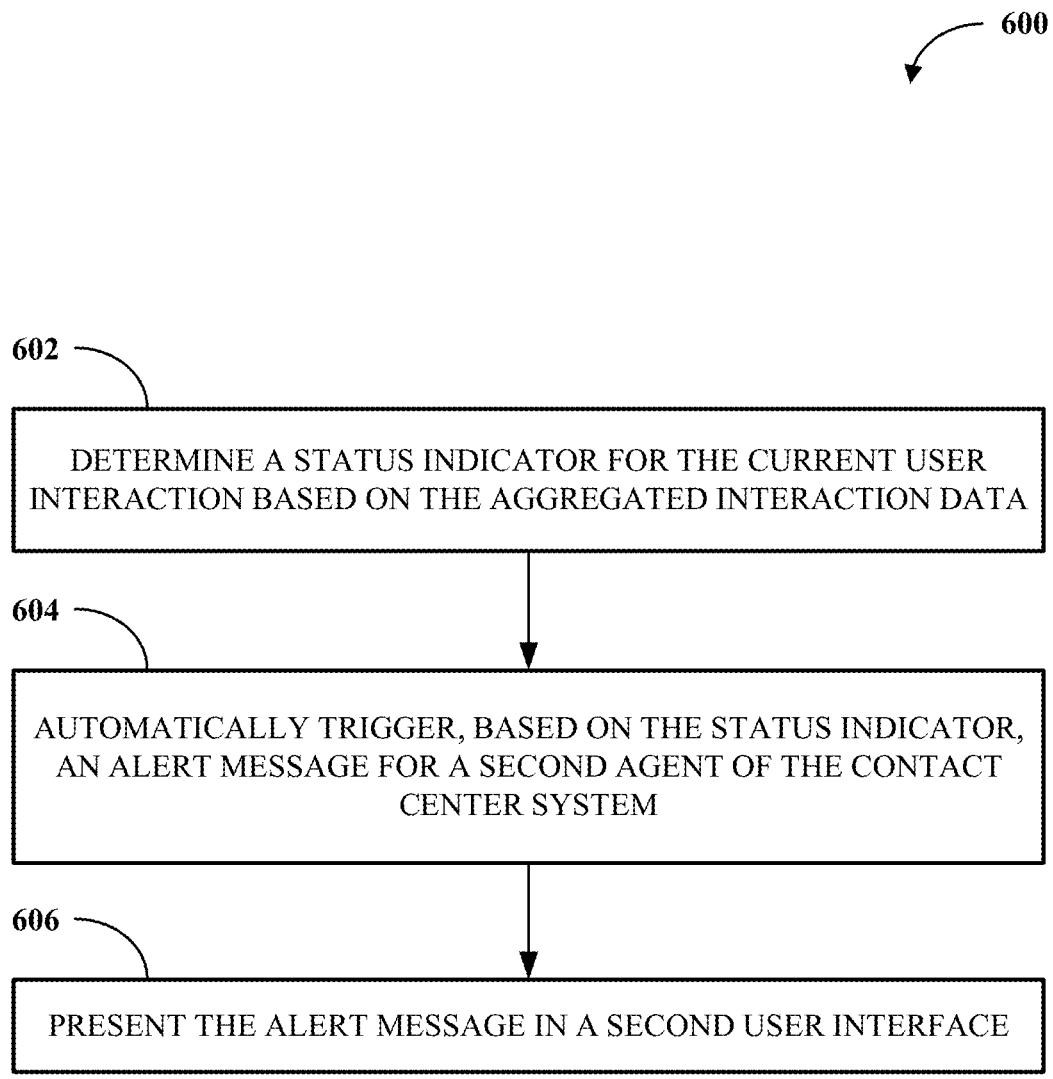
FIG. 6 is a flowchart of an example of a technique for automatically generating an alert for a supervisor agent device in a contact center system.

FIG. 6 is a flowchart of an example of a technique 600 for automatically generating an alert for a supervisor agent device in a contact center system. The technique 600 can be executed using computing devices, such as the systems, hardware, and software described with respect to FIGS. 1-4. The technique 600 can be performed, for example, by executing a machine-readable program or other computer-executable instructions, such as routines, instructions, programs, or other code. The steps, or operations, of the technique 600 or another technique, method, process, or algorithm described in connection with the implementations disclosed herein can be implemented directly in hardware, firmware, software executed by hardware, circuitry, or a combination thereof.

For simplicity of explanation, the technique 600 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 602, the technique 600 includes determining a status indicator for the current user interaction based on the aggregated interaction data. For example, the status indicator may be determined based on an aggregated duration and/or an aggregated sentiment score for correlated user interactions of the user (e.g., proportional to an aggregated duration, proportional to an aggregated sentiment score, or as linear combination of an aggregated duration and an aggregated sentiment score).

At 604, the technique 600 includes automatically triggering, based on the status indicator, an alert message for a second agent (e.g., a supervisor) of the contact center system. For example, an alert message to a supervisor may be automatically triggered (e.g., without escalation from a first agent of the contact center) when a status indicator passes a threshold (e.g., falls below the threshold or rises above the threshold, depending on the format of the status indicator). The alert message may indicate that the current user interaction warrants additional attention and may provide information about the user's history of correlated user interactions.

At 606, the technique 600 includes presenting the alert message in a second user interface (e.g., a webpage). In some implementations, the alert message may be presented by transmitting the alert message as part of a graphical user interface using a network interface (e.g., the network interface 214). The alert message may be transmitted to a device (e.g., the supervisor device 418) that can be used by an agent (e.g., a supervisor) of the contact center system to view the message. In some implementations, the alert message may be presented by displaying the alert message on a local peripheral (e.g., a monitor, a touchscreen, or other display device).

Figure 7:
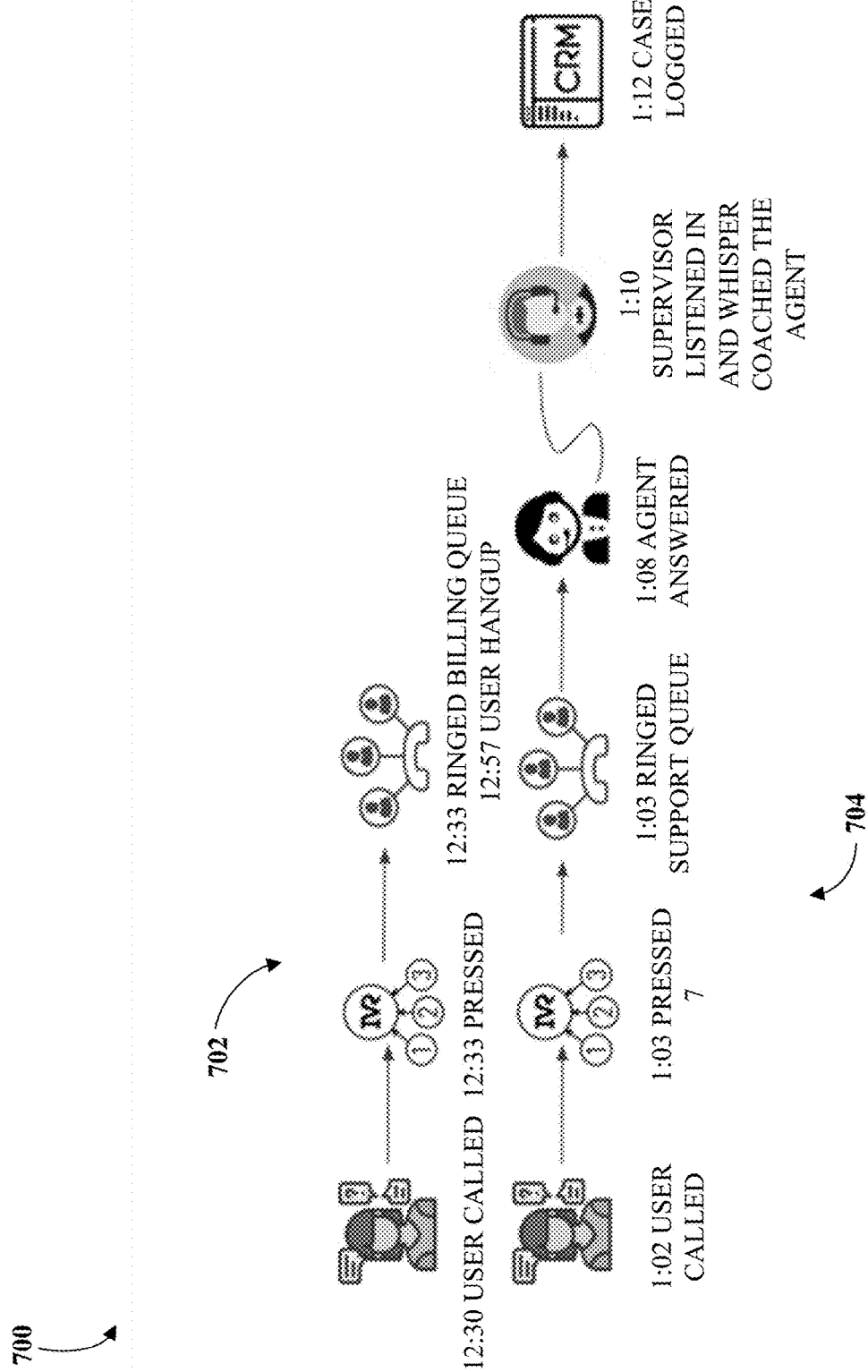
FIG. 7 is an illustration of an example of a history of user interactions with a contact center system configured to conduct user interactions.

FIG. 7 is an illustration of an example of a history 700 of user interactions with a contact center system configured to conduct user interactions. The history 700 includes two user interactions (702 and 704) with the contact center system that have been correlated (e.g., by matching phone numbers associated with the two user interactions). In some implementations, an application server (e.g., the application server 412) of the contact center system may present a graphical representation of the history 700 as part of a user interface (e.g., a webpage) by transmitting the user interface to an agent device for viewing by an agent. The agent may review this history 700 of correlated user interactions while handling a current user interaction that has been correlated to them. In some implementations, the user interface also includes a graphical representation of the current user interaction. In some implementations, a contact center system may generate recommendations based on historical user interaction data aggregated across users, such as, for example, to allocate more resources to the billing queue that the user waited on for 24 minutes in user interaction 702 before hanging up; or to adjust the order of IVR options.

Figure 8:
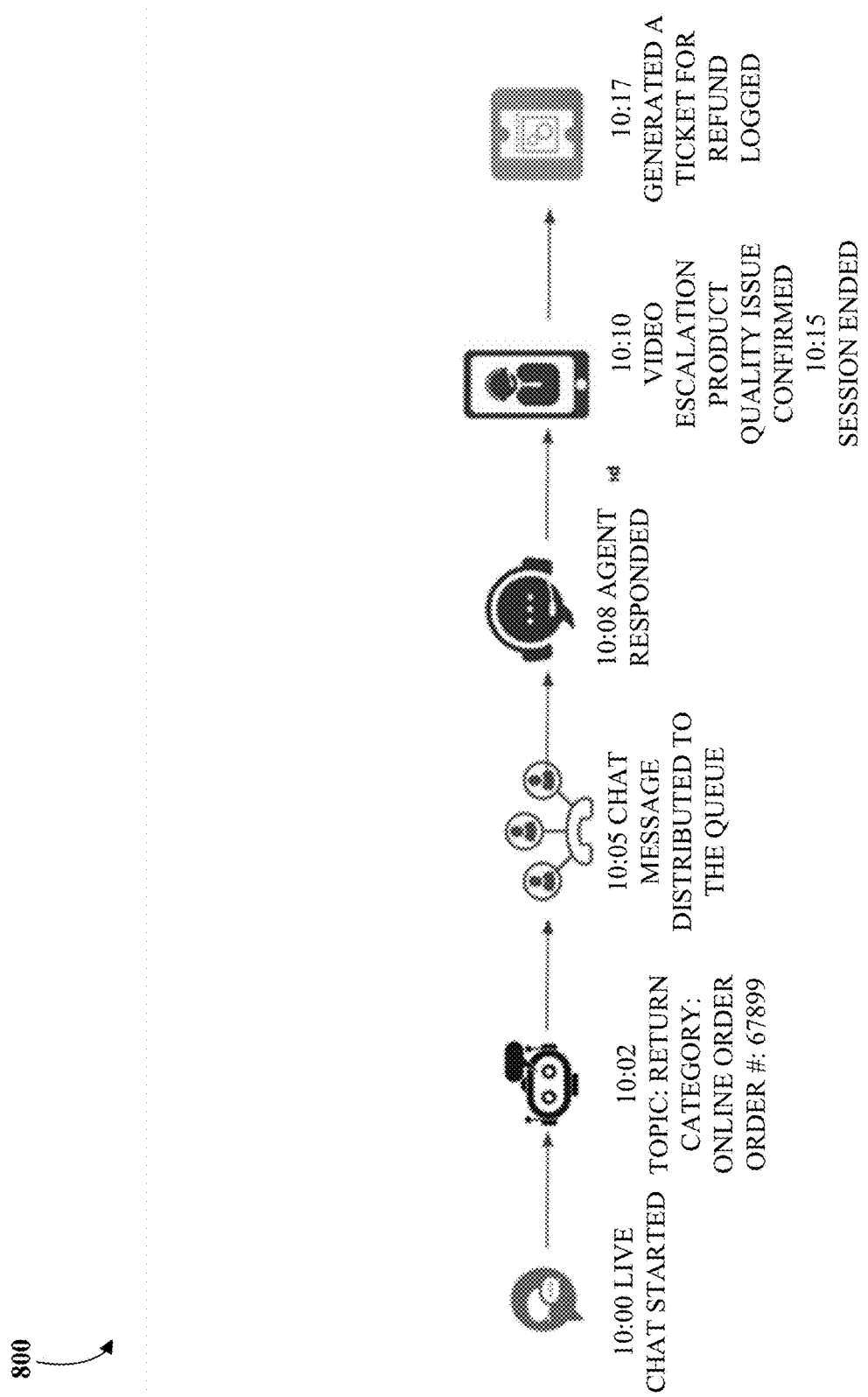
FIG. 8 is an illustration of an example of a user interaction with a contact center system configured to conduct multi-modality user interactions.

FIG. 8 is an illustration of an example of a user interaction 800 with a contact center system configured to conduct multi-modality user interactions. The user interaction 800 is multi-modality in the sense that it includes steps using multiple different communication modalities. The user interaction 800 starts as chat session initiated by the user at 10:00. The user interaction 800 transitions to a voice modality at 10:08. The user interaction 800 transitions to a video modality at 10:10. In some implementations, an application server (e.g., the application server 412) of the contact center system may present a graphical representation of the user interaction 800 as part of a user interface (e.g., a webpage) by transmitting the user interface to an agent device for viewing by an agent. In some implementations, a contact center system may provide the agent speaking with the user starting at 10:08 with a real-time agent assist card, which may include suggestions based on a knowledge base, a wiki, or a frequently asked questions document; a suggestion based on sentiment analysis (e.g., an aggregated sentiment score); and/or speech coaching (e.g., not to use filler words).

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
    correlating a past user interaction with a contact center system to a current user interaction with the contact center system;
    aggregating data of the past user interaction with data of the current user interaction to obtain aggregated interaction data;
    generating a message based on the aggregated interaction data; and
    presenting the message in a user interface.

2. The method of claim 1, wherein the past user interaction and the current user interaction use different modalities for communication.

3. The method of claim 1, wherein the past user interaction is a chat session, and the current user interaction is a phone call.

4. The method of claim 1, wherein the data of the past user interaction includes a first duration of the past user interaction, the data of the current user interaction includes a second duration of the current user interaction, and aggregating the data of the past user interaction with the data of the current user interaction includes determining an aggregated duration based on the first duration and the second duration.

5. The method of claim 1, wherein the data of the past user interaction includes a first sentiment score determined based on a transcript of the past user interaction using a machine learning model, the data of the current user interaction includes a second sentiment score determined based on a transcript of the current user interaction using a machine learning model, and aggregating the data of the past user interaction with the data of the current user interaction comprises determining an aggregated sentiment score based on the first sentiment score and the second sentiment score.

6. The method of claim 1, comprising:
    prioritizing, based on the aggregated interaction data, the current user interaction in one or more queues of user interactions in the contact center system.

7. The method of claim 1, wherein the message includes prompts for assisting an agent of the contact center system to complete the current user interaction.

8. The method of claim 7, wherein the agent is a first agent, the user interface is a first user interface, and comprising:
    determining a status indicator for the current user interaction based on the aggregated interaction data;
    automatically triggering, based on the status indicator, an alert message for a second agent of the contact center system; and
    presenting the alert message in a second user interface.

9. A system comprising:
    a processor, and a memory, wherein the memory stores instructions executable by the processor to:
    correlate a past user interaction with a contact center system to a current user interaction with the contact center system;
    aggregate data of the past user interaction with data of the current user interaction to obtain aggregated interaction data; and
    generate a message based on the aggregated interaction data.

10. The system of claim 9, wherein the past user interaction and the current user interaction use different modalities for communication.

11. The system of claim 9, wherein the past user interaction is a chat session, and the current user interaction is a phone call.

12. The system of claim 9, wherein the data of the past user interaction includes a first duration of the past user interaction, the data of the current user interaction includes a second duration of the current user interaction, and aggregating the data of the past user interaction with the data of the current user interaction includes determining an aggregated duration based on the first duration and the second duration.

13. The system of claim 9, wherein the data of the past user interaction includes a first sentiment score determined based on a transcript of the past user interaction using a machine learning model, the data of the current user interaction includes a second sentiment score determined based on a transcript of the current user interaction using a machine learning model, and aggregating the data of the past user interaction with the data of the current user interaction comprises determining an aggregated sentiment score based on the first sentiment score and the second sentiment score.

14. The system of claim 9, wherein the memory stores instructions executable by the processor to:
    prioritize, based on the aggregated interaction data, the current user interaction in one or more queues of user interactions in the contact center system.

15. The system of claim 9, wherein the message includes prompts for assisting an agent of the contact center system to complete the current user interaction.

16. The system of claim 15, wherein the agent is a first agent, the user interface is a first user interface, and the memory stores instructions executable by the processor to:
    determine a status indicator for the current user interaction based on the aggregated interaction data;

automatically trigger, based on the status indicator, an alert message for a second agent of the contact center system; and present the alert message in a second user interface.

17. A non-transitory computer-readable storage medium, comprising executable instructions that, when executed by a processor, facilitate performance of operations, comprising:

correlating a past user interaction with a contact center system to a current user interaction with the contact center system;

aggregating a first duration of the past user interaction with a second duration of the current user interaction to obtain aggregated duration;

generating a message based on the aggregated duration; and presenting the message in a user interface.

18. The non-transitory computer-readable storage medium of claim 17, wherein the past user interaction and the current user interaction use different modalities for communication.

19. The non-transitory computer-readable storage medium of claim 17, wherein the past user interaction is a chat session, and the current user interaction is a phone call.

20. The non-transitory computer-readable storage medium of claim 17, comprising executable instructions that, when executed by a processor, facilitate performance of operations, comprising:

prioritizing, based on the aggregated duration, the current user interaction in one or more queues of user interactions in the contact center system.

* * * * *